April 9, 1968   M. T. WOODCOCK ET AL   3,377,490
MAGNETOPLASMADYNAMIC ELECTRIC GENERATORS
Filed Dec. 20, 1963
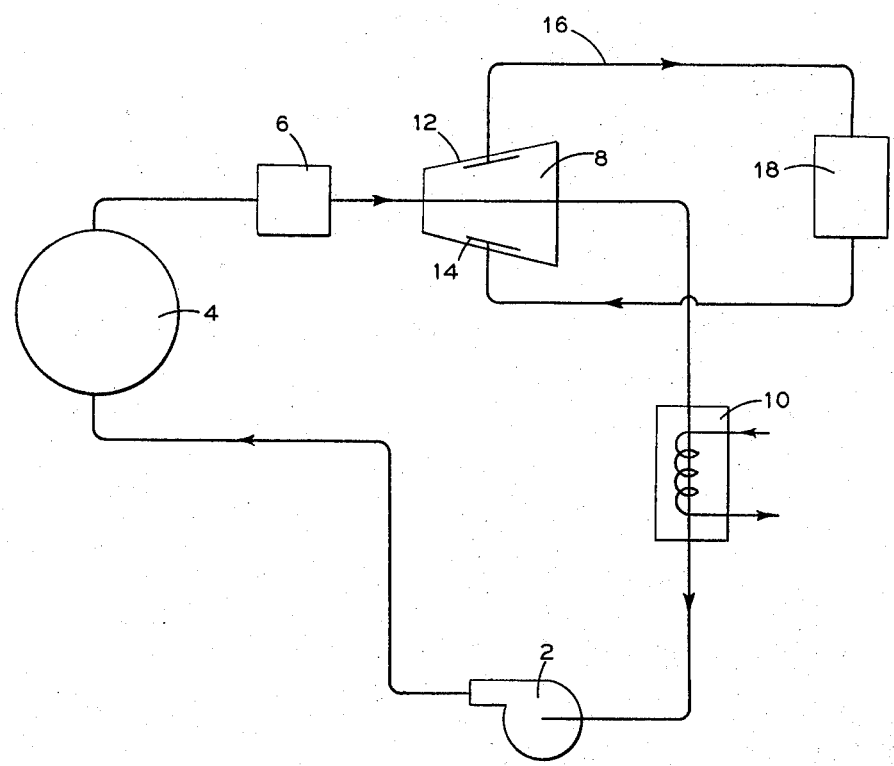
Melville T. Woodcock
John S. Whamby
INVENTORS
BY
ATTORNEY

United States Patent Office 3,377,490
Patented Apr. 9, 1968

3,377,490
MAGNETOPLASMADYNAMIC ELECTRIC GENERATORS
Melville T. Woodcock and John S. Whamby, London, England, assignors to Babcock & Wilcox, Limited, London, England, a corporation of Great Britain
Filed Dec. 20, 1963, Ser. No. 332,180
Claims priority, application Great Britain, Dec. 21, 1962, 48,428/62
4 Claims. (Cl. 310—11)

This invention relates to electric generators of the magnetoplasmadynamic type. Such a generator makes use of a jet of elastic fluid which for operation to occur must be electrically conductive. Proposals have been made to induce ionisation in the working gas of a magnetoplasmadynamic generator by subjecting the gas to a beam of electrons or to a high electric field or by the introduction of a low ionisation potential element such as potassium, sodium, or cesium into the gas when at high temperature. Since solid electron attaching particles in a gas tend to de-ionise the gas it has been considered that the gas jet should be free of such particles. However, when a magnetoplasmadynamic generator is used in conjunction with a gas-cooled nuclear reactor the use of a gas-suspension coolant would be advantageous since the suspended matter would increase the heat carrying capacity of the coolant, would facilitate reactor fuel temperature control and would allow lower gas pressures to be used.

An object of the invention is to enable a magnetoplasmadynamic generator to be operated with a nuclear reactor utilizing a gas-suspension.

The present invention includes a magnetoplasmadynamic electric generator adapted to operate with a flow of ionised fluent medium, means for circulating in a closed circuit including a flow path or nozzle of the generator a suspension of solid particles of heat resistant material in an inert gas, and a nuclear reactor core disposed in said closed circuit and having fuel elements which emit volatile fission products thereby radioactively to contaminate said particles.

The invention also provides a method of operating a magnetoplasmadynamic electric generator which includes circulating a gas suspension in a closed circuit, heating the gas suspension in a reactor core, radioactively contaminating particles within the suspension with volatile fission products from the reactor fuel and supplying the suspension in an ionised state to the generator.

In order that the invention may be more fully understood reference will now be made, by way of example, to the accompanying drawing showing a diagrammatic representation of a magnetoplasmadynamic electric generator for use with a nuclear reactor.

In the drawings a circulator 2 is arranged to circulate gaseous coolant in a closed circuit in sequence through a nuclear reactor 4, an ionisation source 6, a magnetoplasmadynamic generator 8 and a heat exchanger 10.

The ionisation source 6 is of conventional design and might, for example, introduce a seeding element such as cesium into the circuit.

The circulator 2 effects a coolant flow velocity of 100 ft./sec., for example, through the reactor core and a velocity of flow of 0.3 Mach, for example, in the throat of the generator 8.

The fluid is cooled before reaching the inlet to the circulator by the heat exchanger 10 which is suitably a vapour generator.

The magnetoplasmadynamic generator 8 is provided with a magnetic field acting perpendicularly to the plane of the drawing and with electrodes such as electrodes 12 and 14 across which an E.M.F. is induced by the passage of the charged particles in the fluid flow past the electrodes.

The generator 8 may be of any of the known kind and operates in accordance with known principles. For instance the generator might rely principally on the Hall effect in which case the electrodes would be axially spaced along the generator 8.

The electrodes 12 and 14 form a part of an electrical circuit 16 which includes a load 18.

If desired the nuclear reactor core, the magnetoplasmadynamic generator, the coolant circulating means and the heat exchanger may be disposed within a common pressure vessel, a neutron shield being disposed between the core and generator on the one hand and the circulating means and heat exchanger on the other hand.

The reactor fuel is in the form of fuel elements with non-metallic cladding pervious to volatile fission products such as cesium, strontium or barium. In passing through the reactor core during operation of the reactor, the particles of heat resistant material become radioactively contaminated with the fission products in the reactor and the contaminated particles emit radiation which produces ionisation in the gas. As above discussed the de-ionising effect produced by the presence of particles in the coolant gas is compensated for by this ionisation from the contaminated particles.

The particles may be graphite particles and the particle size is five or about five microns. Alternatively silicon carbide, magnesium oxide, beryllium oxide or aluminium oxide may be used in place of graphite.

Appropriately the loading of the material may be up to ten pounds per pound of gas and is preferably within the range of one to two pounds per pound of gas in order to effect the most efficient operation of the generator 8.

The gas is preferably argon, helium, neon or nitrogen having at the inlet to the reactor 4 a pressure preferably not in excess of 300 p.s.i. and a temperature conveniently of about 350° C. giving an outlet temperature of the fluid from the reactor within the range 750–900° C. for example.

While in accordance with the provisions of the statutes we have illustrated and described herein the best form and mode of operation of the invention not known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. A method of operating a magnetoplasmadynamic electric generator which includes circulating a gas suspension in a closed circuit, said gas suspension being loaded with not more than ten pounds of heat resistant particle material per pound of gas, passing the gas suspension through a reactor core at a velocity of approximately 100'/sec. while heating the gas suspension to a temperature range of approximately 750–900° C., radioactively contaminating the particles for ionization within the gas suspension with volatile fission products from the reactor fuel, supplying the suspension in an ionized state to the generator at a velocity of approximately 0.3 Mach in the throat of the generator.

2. A method of operating a magnetoplasmadynamic electric generator according to claim 1 wherein the preferred loading is 1 to 2 pounds of heat resistant particle material per pound of gas.

3. A method of operating a magnetoplasmadynamic electric generator according to claim 1 wherein the particle size of said heat resistant material is of the order of five microns.

4. A method of operating a magnetoplasmadynamic electric generator according to claim 1 which includes the step of cooling the gas suspension to approximately 350° C. prior to its entry into said reactor core.

References Cited

UNITED STATES PATENTS

| 2,210,918 | 8/1940 | Karlovitz | 310—11 |
| 3,140,410 | 7/1964 | McLafferty | 310—11 |

FOREIGN PATENTS

| 837,658 | 6/1960 | Great Britain. |
| 841,613 | 6/1962 | Germany. |

DAVID X. SLINEY, *Primary Examiner.*